Patented Mar. 10, 1925.

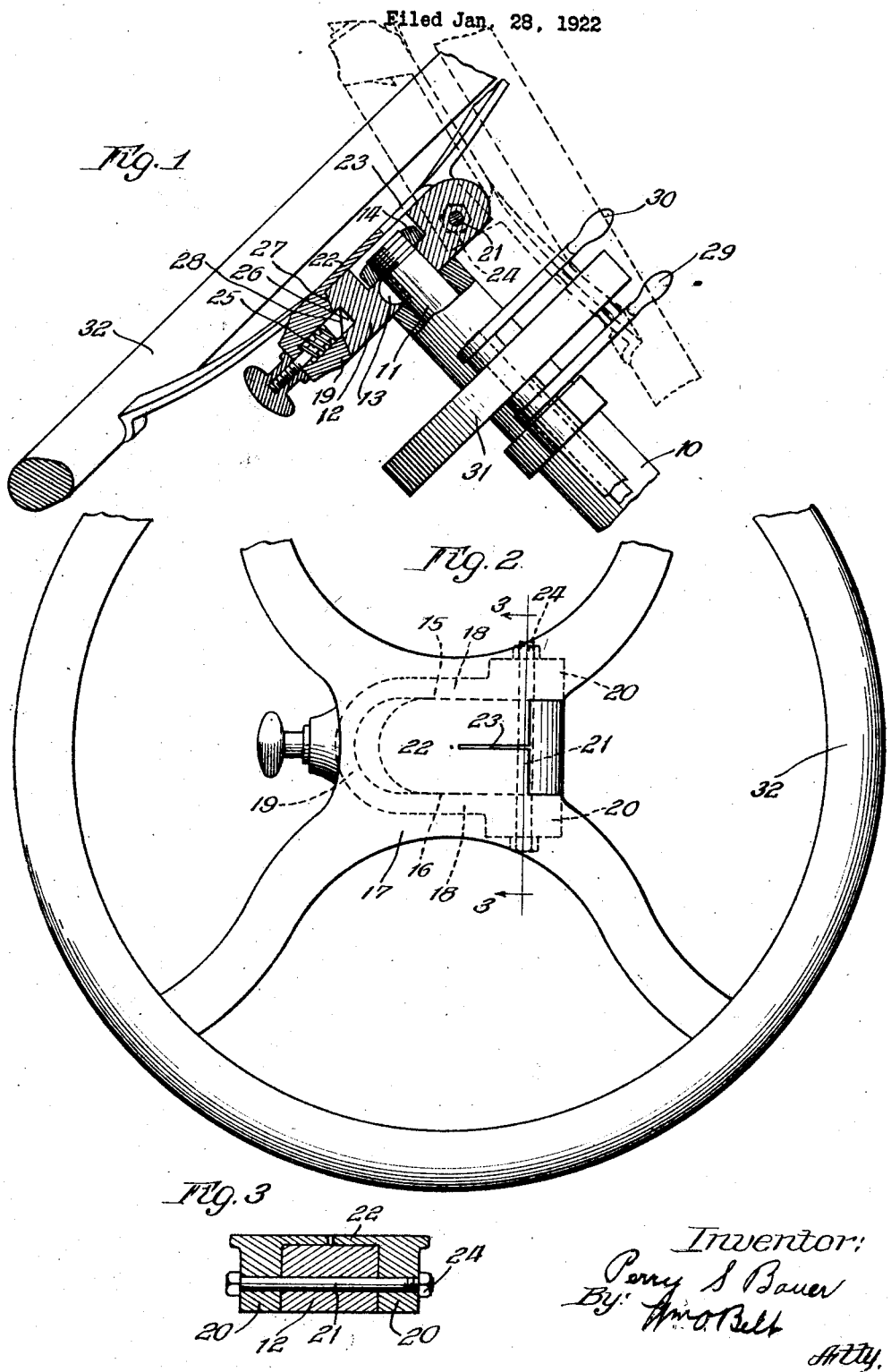

1,528,965

UNITED STATES PATENT OFFICE.

PERRY S. BAUER, OF CHICAGO, ILLINOIS.

TILTING STEERING WHEEL.

Application filed January 28, 1922. Serial No. 532,362.

*To all whom it may concern:*

Be it known that I, PERRY S. BAUER, a citizen of the United States, residing at Chicago, in the county of Cook and State of Illinois, have invented certain new and useful Improvements in Tilting Steering Wheels, of which the following is a specification.

This invention relates to steering gears for automobiles and has for its principal object to permit the steering wheel to be tilted or folded to a position out of the way of the operator in entering or leaving the car.

Another object of the invention is to provide clearance for control levers or other equipment carried on the steering column beneath the wheel.

Another object of the invention is to secure strength and rigidity notwithstanding the pivotal connection between the steering wheel and the shaft, and to permit ready compensation for wear.

Further objects will become apparent as the description is read in connection with the accompanying drawing illustrating a preferred embodiment of the invention, and in which—

Fig. 1 is a vertical section taken in a plane extending lengthwise to the vehicle;

Fig. 2 is a plan view of the steering wheel with a portion broken away; and

Fig. 3 is a transverse section on the line 3—3 of Fig. 2.

Referring to Fig. 1 of the drawing, 10 indicates a steering column in which is rotatably mounted a steering shaft 11. An element 12 which I will call, for convenience, a head, is rigidly secured to the upper end of the steering shaft by the key 13 and the nut 14. This head is substantially rectangular in shape having a bifurcation therein providing the straight sides 15 and 16 adapted to cooperate with corresponding sides of the hub 17 of the steering wheel. The hub is here shown as somewhat horse-shoe shaped comprising the side members 18 connected at their rear ends by the bow 19. The front ends of the side members 18 are slightly enlarged at 20 and pivoted to the front end of the head by a bolt 21. The side members 18 are connected at their upper edges by a transverse plate or cover 22 which is slitted at 23 for about the length indicated in the drawing, to permit the side members 18 to be drawn together by screwing up the nut 24 on the bolt 21 to compensate for wear between the hub and the head.

The hub is equipped with a spring pressed bolt 25 adapted to be seated in a socket 26 in the rear end of the head to lock the steering wheel in operative position. The mating faces of the head and hub at the rear end are correspondingly inclined at 27 and the bolt has an inclined face 28 adapted to ride along the inclined face of the head when the wheel is moved from tilted position to operative position.

In order to provide clearance for control levers 29 and 30 and the segment 31 or any similar equipment that may be carried by the steering column I have connected the hub 17 with the rim 32 by the curved spokes here shown as arranged in two pairs connecting the ends of the side members 18 of the hub to the rim. By arranging the spokes of each pair in the flared relationship shown, suitable clearance is afforded for the control levers and segment or such similar devices that might otherwise interfere with the movement of the wheel to the dotted line position shown in Fig. 1.

By forming the hub of spaced members adapted to embrace the head and connecting these spaced members by a plate as shown, the steering wheel is made very rigid; and by slitting this plate and providing the adjustable pivot so that any wear may be taken up, the wheel can always be kept tight and the hub parts made to fit snugly.

I am aware that changes in the form and proportion of parts, and in the details of construction of my invention may be made without departing from the spirit or sacrificing any of the advantages thereof, and I reserve the right to make all such changes as fairly fall within the scope of the following claims.

I claim:

1. The combination of a steering shaft, a radial head fixed thereon and projecting at opposite sides thereof, a spoked steering wheel having a hub provided with a bifurcation of substantially the size and shape of the head and snugly receiving the same, the hub having a cover plate extending across the top of the bifurcation, said cover plate having a longitudinal slit intersecting the end thereof at the open end of the bifurcation, and a combined draw and pivot bolt extending through the head and the hub and located between the open end of the bifurcation and the steering shaft, a pair of the steering wheel spokes extending outwardly from the hub at opposite sides of the open end of the bifurcation and mutually spaced to straddle a control segment when the wheel is tilted to an upright position.

2. The combination of a steering shaft having a threaded upper end portion, a radial head fixed to the upper end portion of the shaft and projecting above and at opposite sides thereof, the top of the head having a recess surrounding the top of the shaft, a nut on the threaded upper end of the shaft and received within the recess of the head, a spoked steering wheel having a hub provided with a bifurcation of substantially the size and shape of the head and snugly receiving the same, an integral cover plate on the hub and covering the top of the recess in the head, said cover plate having a longitudinal slit intersecting the outer end thereof at the open end of the bifurcation, and a combined draw and pivot bolt extending through the hub and the head and located between the steering shaft and the open end of the bifurcation, a pair of the steering wheel spokes extending outwardly from the hub at opposite sides of the open end of the bifurcation and mutually spaced to straddle a control segment when the wheel is tilted to an upright position.

PERRY S. BAUER.